US007734695B2

(12) United States Patent
Kelley et al.

(10) Patent No.: US 7,734,695 B2
(45) Date of Patent: Jun. 8, 2010

(54) PERSONAL AND TIMED CHAT INTERFACE

(75) Inventors: Edward E. Kelley, Wappingers Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 10/906,822

(22) Filed: Mar. 8, 2005

(65) Prior Publication Data
US 2006/0206566 A1  Sep. 14, 2006

(51) Int. Cl.
*G06F 15/16* (2006.01)
(52) U.S. Cl. ...................................... 709/205; 709/207
(58) Field of Classification Search ......... 709/204–207; 707/7; 715/758
See application file for complete search history.

(56) References Cited

U.S. PATENT DOCUMENTS

| 5,796,393 | A | 8/1998 | MacNaughton et al. | |
|---|---|---|---|---|
| 6,484,196 | B1 * | 11/2002 | Maurille | 709/206 |
| 6,628,302 | B2 | 9/2003 | White et al. | |
| 6,630,944 | B1 | 10/2003 | Kakuta et al. | |
| 6,792,448 | B1 * | 9/2004 | Smith | 709/204 |
| 6,963,904 | B2 * | 11/2005 | Yong | 709/207 |
| 7,039,677 | B2 * | 5/2006 | Fitzpatrick et al. | 709/204 |
| 7,111,044 | B2 * | 9/2006 | Lee | 709/204 |
| 7,167,910 | B2 * | 1/2007 | Farnham et al. | 709/223 |
| 7,284,034 | B2 * | 10/2007 | Matsa et al. | 709/206 |
| 7,328,242 | B1 * | 2/2008 | McCarthy et al. | 709/204 |
| 7,383,307 | B2 * | 6/2008 | Kirkland et al. | 709/206 |
| 7,392,290 | B1 * | 6/2008 | Duffield et al. | 709/206 |
| 7,475,110 | B2 * | 1/2009 | Kirkland et al. | 709/204 |
| 7,480,696 | B2 * | 1/2009 | Kirkland et al. | 709/207 |
| 7,509,389 | B1 * | 3/2009 | Duffield et al. | 709/209 |
| 2002/0059164 | A1 | 5/2002 | Shtivelman | |
| 2003/0028441 | A1 | 2/2003 | Barsness et al. | |
| 2003/0154212 | A1 | 8/2003 | Schirmer et al. | |
| 2003/0187925 | A1 | 10/2003 | Inala et al. | |
| 2003/0227479 | A1 | 12/2003 | Mizrahi et al. | |
| 2004/0054646 | A1 | 3/2004 | Daniell et al. | |
| 2004/0054735 | A1 | 3/2004 | Daniell et al. | |
| 2004/0078446 | A1 | 4/2004 | Daniell et al. | |
| 2004/0143630 | A1 | 7/2004 | Kaufmann et al. | |
| 2005/0055416 | A1 * | 3/2005 | Heikes et al. | 709/207 |
| 2007/0168448 | A1 * | 7/2007 | Garbow et al. | 709/207 |

* cited by examiner

*Primary Examiner*—Faruk Hamza
(74) *Attorney, Agent, or Firm*—DeLio & Peterson, LLC; Kelly M. Nowak; Ronald Kaschak

(57) ABSTRACT

The present invention discloses a method and apparatus for controlling the presentation of submissions within a real-time communication session by sequentially organizing and displaying messages immediately followed by their corresponding responses for allowing participants within the session to easily view, follow and participate within such session. Sequential tags are associated with each submission displayed within the session, whereby these tags are used to sequentially sort the messages along with their corresponding responses. Time stamps associated with each message and response may further be used for sequentially sorting such messages along with their corresponding responses. These sequentially sorted messages and corresponding responses are viewed in a modified display window, optionally along with the unmodified display window of the real-time communication session, on a display screen. This modified display window may be continually refreshed.

19 Claims, 4 Drawing Sheets

| Row | Message | Responder 1 | Responder 2 | Responder 3 |
|---|---|---|---|---|
| 1 | m1 Text | r1.1 Text | | |
| 2 | m1 Text | | r2.1 Text | r3.1 Text |
| 3 | m1 Text | r1.1 Text | r2.1 Text | |
| 4 | m2 Text | r1.2 Text | r2.2 Text | r3.2 Text |
| 5 | m3 Text | r1.2 Text | r2.2 Text | r3.3 Text |

Fig. 1A
PRIOR ART

```
m1 Text
r1.1 Text
m1 Text
r2.1 Text
r3.1 Text
m1 Text
r1.1 Text
r2.1 Text
m2 Text
r1.2 Text
r2.2 Text
r3.2 Text
m3 Text
r1.2 Text
r2.2 Text
r3.3 Text
```

Fig. 1B
PRIOR ART

| Row | Message | Responder 1 | Responder 2 | Responder 3 |
|---|---|---|---|---|
| 1 | m1 Text | | | |
| 2 | m1 Text | | | |
| 3 | m1 Text | r1.1 Text<br>r1.1 Text | r2.1 Text<br>r2.1 Text | r3.1 Text |
| 4 | m2 Text | r1.2 Text<br>r1.2 Text | r2.2 Text<br>r2.2 Text | r3.2 Text |
| 5 | m3 Text | | | r3.3 Text |

Fig. 2A

```
m1 Text
m1 Text
m1 Text
r1.1 Text
r1.1 Text
r2.1 Text
r2.1 Text
r3.1 Text
m2 Text
r1.2 Text
r1.2 Text
r2.2 Text
r2.2 Text
r3.2 Text
m3 Text
r3.3 Text
```

Fig. 2B

PERSONAL AND TIMED CHAT INTERFACE

BACKGROUND OF THE INVENTION

1. Field of the Invention

The present invention is directed generally to real-time communication via data networks, and in particular, to methods and apparatus for maintaining the context of real-time communication sessions across cellular, public or private data networks by controlling the presentation order of submissions displayed within such sessions.

2. Description of Related Art

The use of the Internet as a generalized communication medium has become increasingly popular over the years. As the Internet is expanded in its capabilities and surges in popularity it is manifesting itself in nontraditional ways, the scope of which had never been fully anticipated. In particular, with the exponential rise in the number of Internet users, real-time Web based interaction, such as that seen in Internet "chat" or "instant messaging" has emerged as an amazingly popular and persuasive mode of communication.

Instant messaging and/or chat are well known means of real-time communication between users at remote data network communication devices. Traditional instant messaging and/or chat systems operate through computer-based systems hardwired to the Internet, whereby software enables users to communicate with friends, family, colleagues and the like, and optionally be alerted when such users go on-line for real-time communication. More recently available real-time communication systems include wireless and non-wireless instant message communication environments. A subscriber of these more current systems can send and receive messages by means of a mobile unit device, such as a cell phone. Messages received may originate from a computer on a public data network, such as the Internet, or from other mobile unit devices. Other more recent wireless and non-wireless messaging environments include those that send and receive messages by means of a command-line interface.

Whether the real-time messaging systems are through computer-based systems or wireless and non-wireless environments, the instant messaging software may be preinstalled in such data network systems, or a user may download or installing such software. Once provided with the messaging software, a user of the system registers a personal identifier for distinguishing himself from other users of such messaging software. The user is then able to exchange real-time messages with other users of the real-time messaging software. In the more traditional computer-based systems, real-time messaging allows users to exchange messages in one window without interrupting task(s) in progress in other windows. It is also a valuable resource for allowing colleagues in different geographical locations to quickly and easily communicate in real time for exchanging information, ideas and collaborate together on any given project.

When communicating through an instant message or chat session, a first user is allowed to compose and send a first message to either a selected second user within an instant message session or a group of users within a chat room. However, once the real-time communication session has been initiated, there can be several users and/or messages with responses thereto being concurrently posted within such real-time message sessions. This often leads to messages, and the responses thereto, being posted out of order, making the real-time postings disorderly and difficult to follow, read and respond thereto. For instance, when a user is responding to a posted message, the user may find that another message has been posted during the time which it takes such user to type and post his response, thereby making the user's response outdated or taken out of context. In real-time communication sessions with many participants and/or several messages being posted concurrently or simultaneously, this disorder can be a significant problem.

Accordingly, it would be beneficial to provide methods, systems and apparatus that maintain the context of instant messaging submissions by controlling the display order of such instant messages submissions, as well as the order of the responses thereto.

SUMMARY OF THE INVENTION

Bearing in mind the problems and deficiencies of the prior art, it is therefore an object of the present invention to provide methods and apparatus for maintaining the context of instant messaging submissions by controlling the display order of such instant messages submissions, as well as the order of the responses thereto.

It is another object of the present invention to provide methods and apparatus that allow users within a real-time communication session to follow the sequence of the real-time communication as it actually occurred, with questions and answers in the correct order.

A further object of the invention is to provide methods and apparatus that allow users within a real-time communication session to easily and quickly read and respond to the real-time messages posted therein.

Still other objects and advantages of the invention will in part be obvious and will in part be apparent from the specification.

The above and other objects, which will be apparent to those skilled in art, are achieved in the present invention, which is directed to in a first aspect a method for controlling the presentation of submissions within a real-time communication session. The method includes providing a plurality of messages having sequentially assigned message identifier tags within a real-time communication session and providing a plurality of responses to the messages, each having assigned response identifier tags, within such session. Corresponding responses to each of the plurality of messages are determined from the plurality of responses using the assigned response identifier tags. These plurality of messages and responses are then sorted such that each of the plurality of messages is sequentially listed according to the sequentially assigned message identifier tags, and is immediately followed by the corresponding responses thereto. The sorted plurality of messages and responses are displayed in a modified display. The corresponding responses may further be sequentially sorted according to a time stamp of each the corresponding response. The system and method is for use on any type of data network communication device including, but not limited to, computer-based systems, wireless environments, non-wireless environments and combinations thereof.

In this aspect, the identifier tags may be assigned either manually by participants within the session, or by software running on a data network communication device. Preferably, the real-time communication session is initiated by a first participant, and a message identifier tag is assigned to a first message submitted by this first participant. The session is then activated by a second participant, whereby the system automatically assigns by default a responder identifier tag to this second participant. A second submission is then submitted within the real-time communication session. This second submission may be either a response to a message displayed within the session, or it may be another message for posting and displaying within such session. If it is another message, the second participant may have changed his responder identification tag to a message identifier tag to denote his submission as a message, rather than a response. The message may be a new message, or it may add content to an already existing message within the session. The foregoing method steps may be repeated any number of times for continually refreshing the modified display, which is viewed by a participant on a display screen.

In a second aspect, the present invention is directed to a program storage device readable by a processor capable of executing instructions, tangibly embodying a program of instructions executable by the processor to perform the above discussed method steps for controlling the presentation of submissions within a real-time communication session.

In a third aspect, the present invention is directed to a computer program product including computer usable medium having computer readable program code means embodied therein for controlling the presentation of submissions within a real-time communication session in accordance with the method described above, and in more detail below.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1A is a prior art illustration showing a table of the actual posting order of a plurality of messages within a real-time communication message session.

FIG. 1B is a prior art illustration showing how the real-time communication session postings of FIG. 1A would be displayed on a screen viewed by the participants within such session.

FIG. 2A is a table showing the modified posting order of a plurality of messages within a real-time communication message session in accordance with the present invention.

FIG. 2B is an illustration of how the modified postings of the invention shown in FIG. 2A would be displayed on a screen viewed by participants within such session.

DESCRIPTION OF THE PREFERRED EMBODIMENT(s)

Figure 3A:
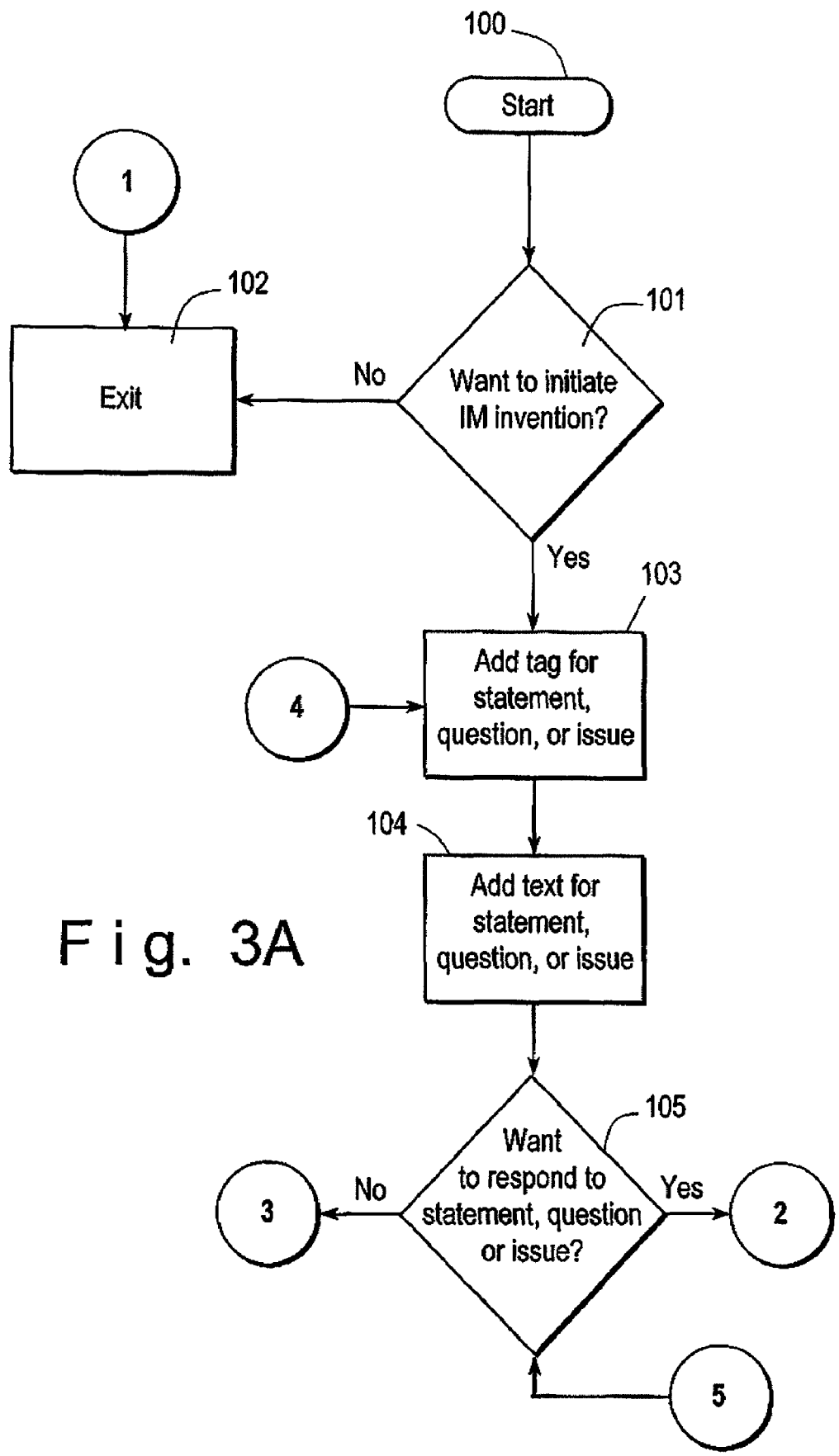
FIG. 3A is a flow diagram illustrating the method steps of the present invention of controlling the posting and display order of message and response submissions within a real-time communication session.

In describing the preferred embodiment of the present invention, reference will be made herein to FIGS. 1A-3B of the drawings in which like numerals refer to like features of the invention.

The present invention is aimed at overcoming the problems associated with messages and responses being posted and displayed out of order within a real-time communication session, such that the session is disorderly and difficult to follow, read and communicate within. In instant message sessions or chat sessions with many participants, this type of disorder can be a significant problem. A conventional sequence of a real-time communication session is shown in the table of an actual session in FIG. 1A. This table includes a user "m" who has initiated a first topic message "m1", a second topic message "m2" and a third topic message "m3". The table also includes three (3) different responders (i.e., other users) within the session who have responded to user "m's" messages, namely, first responder "r1", second responder "r2" and third responder "r3". The suffixes ".1", ".2" and ".3" refer respectively to the responses to messages "m1, "m2" and "m3".

As is shown, in Row 1 the first user "m" enters the first topic message "m1", which may be a statement, question, issue and/or the like. The first responder "r1" responds to the first user's first message "m1", which is represented as "r1.1" in Row 1. Row 2 indicates that the first user "m" is continuing to add text to the first topic message "m1", such that, without realizing it, the first responder "r1" has submitted response "r1.1" in Row 1, when in actuality, the first topic message "m1"had not yet been completed by the first user "m". Similarly, the second responder "r2" and third responder "r3" have responded to the revised first topic message "m1" in Row 2, when in actuality, the first topic message "m1" still had not been completed, as is shown by the added text "m1"in Row 3. First responder "r1" and second responder "r2" both responded to the further revised "m1" in Row 3 by submitting responses "r1.1" and "r2.1", respectively.

Row 4 illustrates a further problem within the current real-time communication session in that the first user "m" has now posted a second topic "m2" within such session. However, certain responders within the session are still responding to the first topic "m1", while other responders are responding to the new second topic message "m2". For instance, as shown in FIG. 4, the first responder "r1" is now responding incorrectly (i.e., out of sequence) to the first topic message "m1" by submitting "r1.1", while the second and third responders are responding to the new second message "m2" in sequence by submitting "r2.2" and "r3.2", respectively. Row 5 indicates that the first user "m" has submitted yet another message, namely third message "m3", whereby the first and second responders are now incorrectly or out of order responding to the previously posted second message "m2" by submitting "r1.2" and "r2.2", while only the third responder is responding in the correct sequence to the third message "m3" by submitting response "r3.3".

FIG. 1B shows how the real-time communication session would appear on a screen viewed by the participants within such session. As is shown, the topic messages "m1" to "m3" are out of synchronization with the corresponding responses thereto, such that these messages and responses are posted and displayed out of order, making it difficult to follow and participate within this real-time communication session. It also leads to the possibility that a responder's response may be taken out of context.

FIGS. 2A-3B refer to the present invention, which is aimed at overcoming the problems associated with messages and responses being posted and displayed in an untimely manner, as well as being out of order, within a real-time communication session. The present invention overcomes the above problems by providing an easy and efficient manner in which to post, display and view messages in a real-time communication session, whereby topic messages are displayed and viewed in sequential order along with their corresponding responses. This advantageously enables the real-time communication session to be orderly, and easy to follow, read and participate within. FIG. 2A shows a modified sequence of a real-time communication session in accordance with the invention. As is shown, the responses to the first topic message "m1"are posted after it has been determined that the first topic message has been completed by user "m1". In so doing, all responses to message "m1" are posted in Row 3 once message "m1" has been completed by user "m". The responses are further posted in order according to each responder, namely, "r1" to "r3".

FIG. 2B shows the screen display results of the present modified sequence of real-time communication messages that is viewed by participants within such session. Once again, responses to messages are not displayed until it has been determined that the message "m" has been completed, whereby each response is sequentially displayed according to each individual responder and time posted within such session. For instance, once it is determined that the first user "m" has completed the first message "m1", the responses are displayed in sequential order according to responder and the time posted (e.g., "r1.1" and "r1.1" of the first responder are posted, followed by "r2.1" and "r2.1" of the second responder, and then "r3.1 of the third responder). The invention advantageously posts and displays real-time communication messages, and the corresponding responses thereto, in a sensible, orderly sequence for easy viewing and responding to by participants within the session.

Figure 3B:
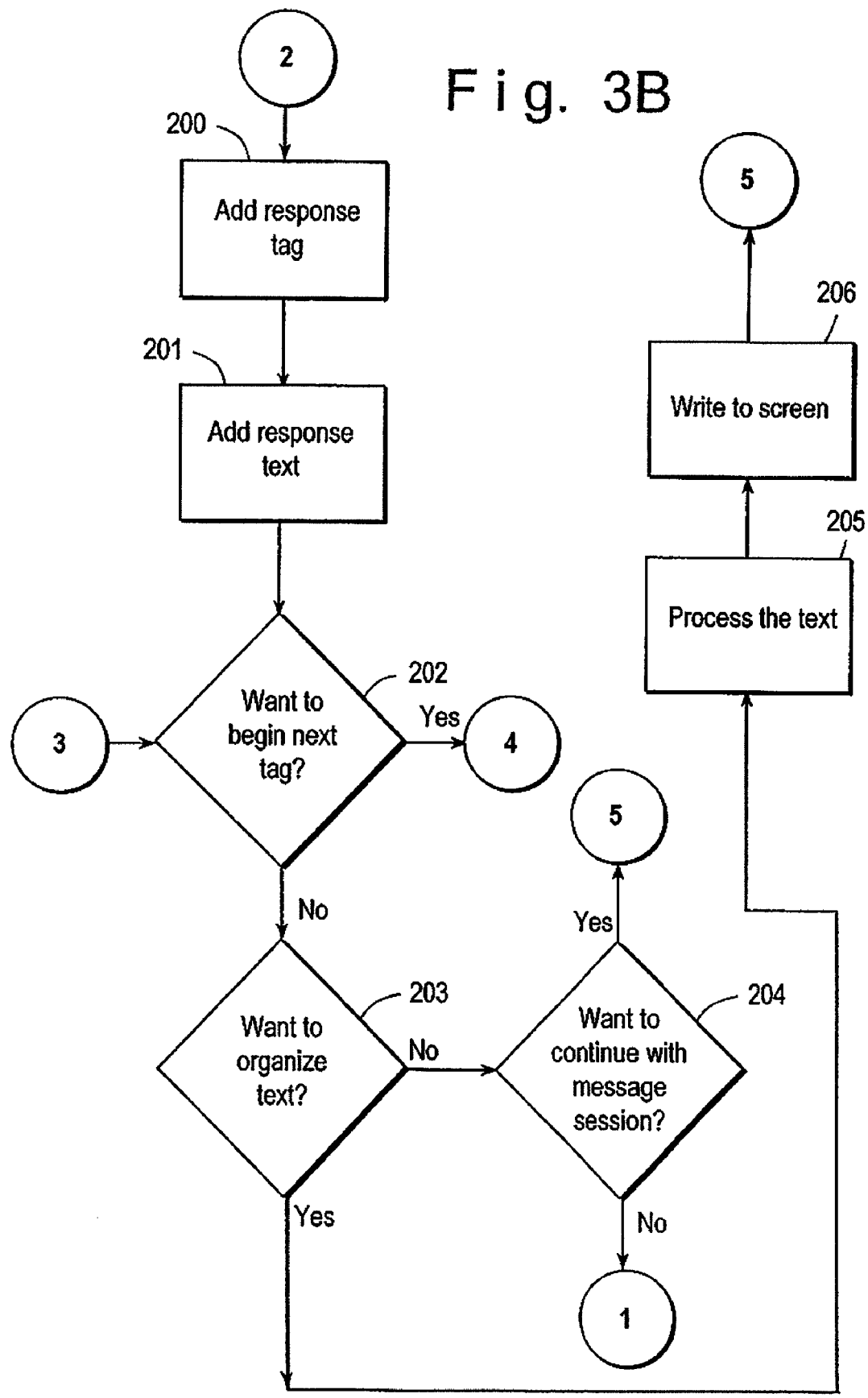
FIG. 3B is a flow diagram continuing the method steps of FIG. 3A.

Flow charts of the process used in the present invention are shown in FIGS. 3A and 3B. Numerals in circles indicate connections to and from other parts of the flow chart.

For ease of understanding the invention, FIGS. 2A-3B are described in relation to exchanging real-time instant messages (IM) operated through computer-based systems. However, it should be appreciated and understood that the present invention may be used in conjunction with a variety of remote data network communication devices for exchanging any type of real-time communication messages. For instance, the invention is suitable for use with chat session and instant message sessions, whether such sessions are occurring through computer-based systems, wireless environments, non-wireless environments or combinations thereof. Remote data network communication devices for use in accordance with the invention include, but are not limited to, real-time communication messages operated through computer-based systems hardwired to the Internet, wireless real-time communication environments and non-wireless real-time communication environments.

FIG. 3A illustrates the method steps of the present invention for controlling the posting and display order of message and response submissions within a real-time communication session, and the flow chart description is as follows:

Start. Start the process. Go to step 101.

Want to initiate the IM invention? A user must decide whether or not he would like to initiate the present invention for controlling the posting and display order of message and response submissions within a real-time communication session. If no, the process flow goes to step 102 and the method is exited. If yes, the process flow continues to step 103.

Exit. End the present method for controlling the posting and display order of submissions within a real-time communication session.

Add tag for statement, question or issue. Once the present invention has been activated, a user of the system initiates a message entry "m_" that is to be posted and displayed within the current real-time communication session.

Wherein this user is the first user of the invention, upon activating the system and composing a first message entry within the session, the first user is assigned a tag that identifies him from other users of the system. The tags may be any suitable identifier for distinguishing users of the invention from one another including, but not limited to, letters, words, numbers, color codes, pictures, emoticons, and the like, or even combinations thereof. For instance, the first message entry of the first user may be identified as message entry tag "m1". This new message entry "m1"may be a statement, question, issue or the like.

If, however, the user is a second user of the system, and the system has assigned such user an identifying responder tag "r_" by default, then this responder "r_" may decide to submit a message entry "m_" rather than a response. In so doing, only the responder "r_" views on his screen that the system is identifying him as a responder with the identifying tag status "r_". The responder "r_" may manually change his status to indicate that he does not want to respond to any currently posted message "m_", but would rather create his own new message entry ("m2", "m3", etc.). This may be accomplished by responder "r_" manually changing his identifier tag from "r_" to "m_", which denotes that such user is to compose a new message entry, and then compose, post and display such new message entry within the current session. Similarly, in the event that this user decides he would like to respond to a message entry, after he has changed his participant status to "m_", he once again may manually change his participant status back to responder "r_", and respond to a desired message. Alternatively, rather than manually changing the user's participating status, the user may select the next sequential new message entry number from a drop down menu or box, which will automatically indicate that such user desires to compose a new message entry, thereby changing the user's identifier tag from "r_" to "m_". The user can then compose, post and display the new message entry along with its corresponding message number "m_" (e.g., "m2", "m3", etc.) within the session.

Further in accordance with the invention, after step 202 (discussed below), a user that has submitted a displayed message entry "m_"may decide, after submitting the initial entry of such message, that he would like to add content to such message, or continue the statement, question, issue and the like of such message. Alternatively, another participant within the session may decide to add content to the currently displayed message entry "m_". At this point, any user, or participant within the session, may compose, post and display the continuing content for the message entry "m_". In so doing, the continuing message entry will be assigned the same message entry tag "m_" as the initially displayed message, either by the user manually typing the message entry tag "m_", or the system automatically assigning the message entry tag "m_" via a drop box or menu. For instance, FIG. 2A illustrates that a user of the present system, who initially submitted message "m1" (Row 1), continued such message "m1" by adding content thereto twice (i.e., Rows 2 and 3). That is, message "m1" was posted and displayed in three (3) separate fragments.

Once the identifying tag has been assigned to the message entry "m_", the process flow then continues to step 104.

Add text for statement, question or issue. Once the message tag "m_" has been assigned to the user's message within the system, this user then composes the message. The message may have content that includes, but is not limited to, text, pictures, color, sound, etc. The message entry "m_" (e.g., "m1", "m2", "m3", etc.) is then posted and displayed within the real-time communication session for all participants therein to view, and potentially respond thereto. The process flow continues to step 105.

105 Want to respond to the statement, question or issue? The present system automatically assigns each and every other user of the invention, aside from the initiator, an identifying responder tag (e.g., "r1", "r2", "r3", etc.) by default. The displayed responder tags are visible to all participants within the session. These responder tags identify and distinguish each responder from other responders within the session, and are preferably sequentially assigned numerically by the present system. In accordance with the invention, when each responder "r_" activates the present system, he is automatically assigned a responder tag "r_" by default that is viewed only by such responder on his viewing screen. The responder (e.g., "r1", "r2" "r3", etc.), who may be viewing the session or actively participating within such session, must then decide whether or not he would in fact like to be a responder, and respond to a message (e.g., "m2", or "m3") displayed within the session, or alternatively, whether he would like to compose, post and display a new message entry (e.g., "m4") within the session. If responder "r_" would like to respond to a displayed message "m_" within the session, then the process flow continues to step 200 for posting and displaying a response to such message "m_". If, however, responder "r_" does not want to respond to message "m_", then the process flow continues to step 202, where responder "r_" must decide whether or not he would like to compose, post and display a new message entry which may include a statement, question, issue or the like. Accordingly, in the present system all users that are participating within the current session have the option of either responding to any displayed text viewed on their respective screens in steps 200 and 201, or alternatively composing, posting and displaying new message entry(s) (e.g., "m2", "m3, "m4", etc.), for responding thereto in step 202, et seq.

FIG. 3B illustrates the continuing method steps of the present invention shown in FIG. 3A, and the flow chart description continues as follows:

200 Add response tag. Once responder "r_" has decided that he would like to respond to message "m_" displayed in the session, responder "r_" selects the message he would like to respond to, and initiates a response entry to generate a response tag. This may be accomplished by responder "r_" manually selecting a desired message entry (e.g., "m1", "m2", "m3", etc.) to respond to, and then typing in a response tag that identifies both the particular responder "r_", as well as the message entry "m_" that such responder is responding to. For instance, responder "r_" may manually type in identifying response tag "r1.1", which identifies that the responder is the first responder within the session and that he is responding to the first displayed message, or he may type in "r3.2", which identifies that the responder is the third responder within the current session and that he is responding to the second displayed message within the session, and so forth. Alternatively, the responder "r_" may select from a drop down menu or box a desired displayed message "m_" to respond to (e.g., "m1", "m2", "m3", etc.) from all the currently existing message entries within the session. Once the desired messages is selected, the present system automatically assigns the identifying tag "r1.1", "r3.2", etc. thereto, which again identifies both the particular responder "r_" as well as the message "m_" such responder is responding to. The process flow continues to step 201.

201 Add response text. Once a response tag has been generated, responder "r_" then composes his response, which may include text, pictures, color, sound, etc. This response, along with its corresponding response tag (e.g., "r1.1", "r2.1", "r3.2", etc.), is posted and displayed within the current session for all participants to view, and potentially respond to even further. The process flow continues to step 202.

202 Want to begin next tag? New message entry(s) (e.g., "m2", "m3, "m4", etc.) may then be initiated by two different process flows of the present system. In a first aspect, in step 105, the responder "r_" may decided that he does not want to respond to any currently existing messages, such that the process flow continues to step 203, wherein this responder must determine whether or not he would like to compose and submit a new message entry (e.g., "m2", "m3, "m4", etc.). In a second aspect, after step 201, once a responder "r_" has posted and displayed a response to an existing message entry, the process flow continues to step 202 to allow the responder "r_" to determine whether or not he would like to compose and submit a new message entry (e.g., "m2", "m3, "m4", etc.) within the session. In both of the foregoing aspects, if the responder "r_" would like to initiate a new message entry, the process flow cycles back to step 103, et seq., as discussed in detail above. If, however, the responder "r_" does not want to initiate a new message entry, the process flow continues to step 203.

203 Want to organize the text? In this step, a user of the invention must decide whether or not he wants the messages and responses thereto to be displayed in an orderly, sequential manner in accordance with the invention on the user's screen. If the user would like to organize the submissions displayed on his screen, then the process flow continues to step 205, wherein such submissions are processed. If, however, the user does not want to organize the submissions displayed on his screen, the process flow continues to step 204, wherein the user must decide whether or not he would like to continue the current session.

204 Want to continue with the current message session? Each user of the invention that has decided he does not want to organize the submissions displayed on his screen, must then decide whether or not he would like to continue participating within the current real-time communication session. If yes, the process flow cycles back to step 105 where the user must decide whether or not he would like to respond to any currently displayed message entries "m_". If the user does not want to continue with the current session, then the process flow continues to step 102, where the current session is ended and the present system is exited.

205 Process the text. After step 203, wherein a user has decided that he would like to organize the submissions displayed on his screen, the present system sequentially organizes and lists the posted and displayed messages using an identifier tag that establishes the order in which such message entry tags were posted and displayed within the session. Preferably, the message entries are sequentially organized and listed by their numerical message entry tags (i.e., "m1", "m2" "m3, "m4", etc.). Where more than one entry exists for a message entry "m_" (e.g. "m1" in Rows 1, 2 and 3 in FIG. 2A), these plurality of entries are further listed according to the time that each message entry was started, or alternatively, the time each message entry was displayed. The displayed responses to such organized messages are also sequentially organized and listed with their corresponding message entries. These organized responses may be listed according to the time that each response was started, or alternatively, the time each response was posted and displayed within the session. As such, each message entry "m_", whether it is composed of a single displayed message or multiple displayed messages, will be immediately followed by the responses that apply to such message entry "m_". For example, FIG. 2A illustrates the organization and listing of multiple messages, along with their corresponding responses, in accordance with the invention. The process flow continues to step 206.

206 Write the organized text to the screen. Once the messages and responses have been organized and sequentially listed in step 205, these results are then posted and displayed on the user's screen in a controlled and orderly fashion. This allows the user to easily view the modified submissions or postings of the session within the present modified display window, as well as easily follow and participate within the current session. FIG. 2B illustrates a modified display window of the invention viewed on a participant's screen. This modified display window may be a second window viewed on the user's display screen, whereby it may appear next to the original, unmodified display window (e.g., FIG. 1B) viewed on the user's display screen. In accordance with the invention, each participant within the current session is able to view a modified display window on their respective display screens, whereby each modified display window on the various participant's screens may vary depending upon when during the session the participant selected the option of organizing the text (i.e., messages and responses) in step 203. This allows all participants within the session to follow the progression of the session as it actually occurred, with questions and answers in the correct order. Once the session submissions are presented on the user's screen in the controlled manner of the invention, the process flow cycles back to step 105. In so doing, the user of the present system may then continue to submit submissions (i.e., messages and/or responses) within the current session, as well as continually refresh the modified display window of the invention. Additionally, a user of the system may edit the transcript of the modified display of the invention with a side-by-side window, which after such changes have been completed may be used to replace the window of record for storage.

It should be appreciated that components of the present invention may be embodied as a computer program product stored on a program storage device. The computer program product includes computer usable medium having computer readable program code means embodied therein for controlling the presentation of submissions within a real-time communication session in accordance with the method described herein. The program storage devices may be devised, made and used as a component of a machine that utilizes optics, magnetic properties and/or electronics to perform certain of the method steps of the present invention. Such program storage devices may include, but are not limited to, magnetic media such as diskettes or computer hard drives, magnetic tapes, optical disks, Read Only Memory (ROM), floppy disks, semiconductor chips and the like. A computer readable program code means in known source code may be employed to convert certain of the method steps described below.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for controlling a presentation of submissions within a real-time communication session comprising:
    providing a plurality of messages having sequentially assigned message identifier tags within the real-time communication session running on a data network communication device;
    providing a plurality of responses to said plurality of messages on said data network communication device, each of said plurality of responses having assigned response identifier tags within said real-time communication session, each of said response identifier tags including an identification of a specific message to which said response is responding to, the specific message being selected by a user from the plurality of messages;
    determining corresponding responses to each of said plurality of messages from said plurality of responses using said assigned response identifier tags;
    sorting said plurality of messages and responses whereby each of said plurality of messages is sequentially listed according to said sequentially assigned message identifier tags and is immediately followed by said corresponding responses thereto; and
    displaying said sorted plurality of messages and responses in a modified display during said real-time communication session running on said data network communication device.

2. The method of claim 1 further including sequentially sorting said corresponding responses according to a time stamp of each said corresponding response.

3. The method of claim 1 wherein said plurality of messages are selected from a group consisting of questions, statements, issues and combinations thereof.

4. The method of claim 1 wherein said message identifier tags are selected from a group consisting of letters, words, numbers, color codes, pictures, emoticons and combinations thereof.

5. The method of claim 1 wherein said response identifier tags are assigned manually by participants within said real-time communication session.

6. The method of claim 1 wherein said response identifier tags are assigned automatically by software running on the data network communication device on which said real-time communication session is running.

7. The method of claim 1 wherein said real-time communication session is selected from a group consisting of an instant message session and a chat session.

8. The method of claim 1 further comprising:
    initiating said real-time communication session by a first participant;
    assigning a first message identifier tag to a first message submitted by said first participant, said first message being from said plurality of messages having said sequentially assigned message identifier tags;
    activating said real-time communication session by at least a second participant;
    assigning by default a first responder identifier tag to said second participant;
    submitting at least a second submission within said real-time communication session by said second participant;
    said first participant viewing a first modified display of said sorted plurality of messages and responses on a first data network communication device; and
    said at least second participant viewing a second modified display of said sorted plurality of messages and responses on a second data network communication device.

9. The method of claim 8 wherein said at least second submission comprises one of said plurality of responses which is responsive to one of said plurality of messages.

10. The method of claim 9 wherein said at least second participant selects an existing message within said real-time communication session from said plurality of messages to which said at least second participant would like to respond to.

11. The method of claim 8 further comprising:
    changing said responder identifier tag of said at least second participant to one of said sequentially assigned message identifier tags;
    submitting said at least second submission which comprises one of said plurality of messages.

12. The method of claim 11 wherein said one of said plurality of messages comprises a new message within said real-time communication session.

13. The method of claim 11 wherein said one of said plurality of messages adds content to an existing message within said real-time communication session.

14. The method of claim 8 wherein said first modified display differs from said second modified display.

15. The method of claim 8 wherein said first and second data network communication devices are selected from a group consisting of computer-based systems, wireless environments, non-wireless environments and combinations thereof.

16. The method of claim 1 wherein said modified display of said sorted plurality of messages and responses comprises a modified display window viewed on a display screen along with an unmodified display window of said real-time communication session.

17. The method of claim 1 further including repeating steps to refresh said modified display.

18. A program hardware storage device readable by a processor executing instructions, tangibly embodying a program of instructions executable by the processor to perform method steps for controlling a presentation of submissions within a real-time communication session, said method steps comprising:

providing a plurality of messages having sequentially assigned message identifier tags within the real-time communication session running on a data network communication device;

providing a plurality of responses to said plurality of messages on said data network communication device, each of said plurality of responses having assigned response identifier tags within said real-time communication session, each of said response identifier tags including an identification of a specific message to which said response is responding to, the specific message being selected by a user from the plurality of messages;

determining corresponding responses to each of said plurality of messages from said plurality of responses using said assigned response identifier tags;

sorting said plurality of messages and responses whereby each of said plurality of messages is sequentially listed according to said sequentially assigned message identifier tags and is immediately followed by said corresponding responses thereto; and displaying said sorted plurality of messages and responses in a modified display during said real-time communication session running on said data network communication device.

19. A computer program product comprising:

a computer program hardware storage device having computer readable program code means embodied therein for controlling a presentation of submissions within a real-time communication session, said computer program product having:

computer readable program code means for causing a computer to provide a plurality of messages having sequentially assigned message identifier tags within the real-time communication session on a data network communication device;

computer readable program code means for causing said computer to provide a plurality of responses to said plurality of messages running on said data network communication device, each of said plurality of responses having assigned response identifier tags within said real-time communication session, each of said response identifier tags including an identification of a specific message to which said response is responding to, the specific message being selected by a user from the plurality of messages;

computer readable program code means for causing said computer to determine corresponding responses to each of said plurality of messages from said plurality of responses using said assigned response identifier tags;

computer readable program code means for causing said computer to sort said plurality of messages and responses whereby each of said plurality of messages is sequentially listed according to said sequentially assigned message identifier tags and is immediately followed by said corresponding responses thereto; and computer readable program code means for causing said computer to display said sorted plurality of messages and responses in a modified display during said real-time communication session running on said data network communication device.

* * * * *